Aug. 27, 1935.  W. FERRIS  2,012,423
BLANKING AND FORMING PRESS AND METHOD OF FORMING BLANKS
Filed Nov. 25, 1932   9 Sheets-Sheet 2

INVENTOR.
WALTER FERRIS.
BY
ATTORNEY.

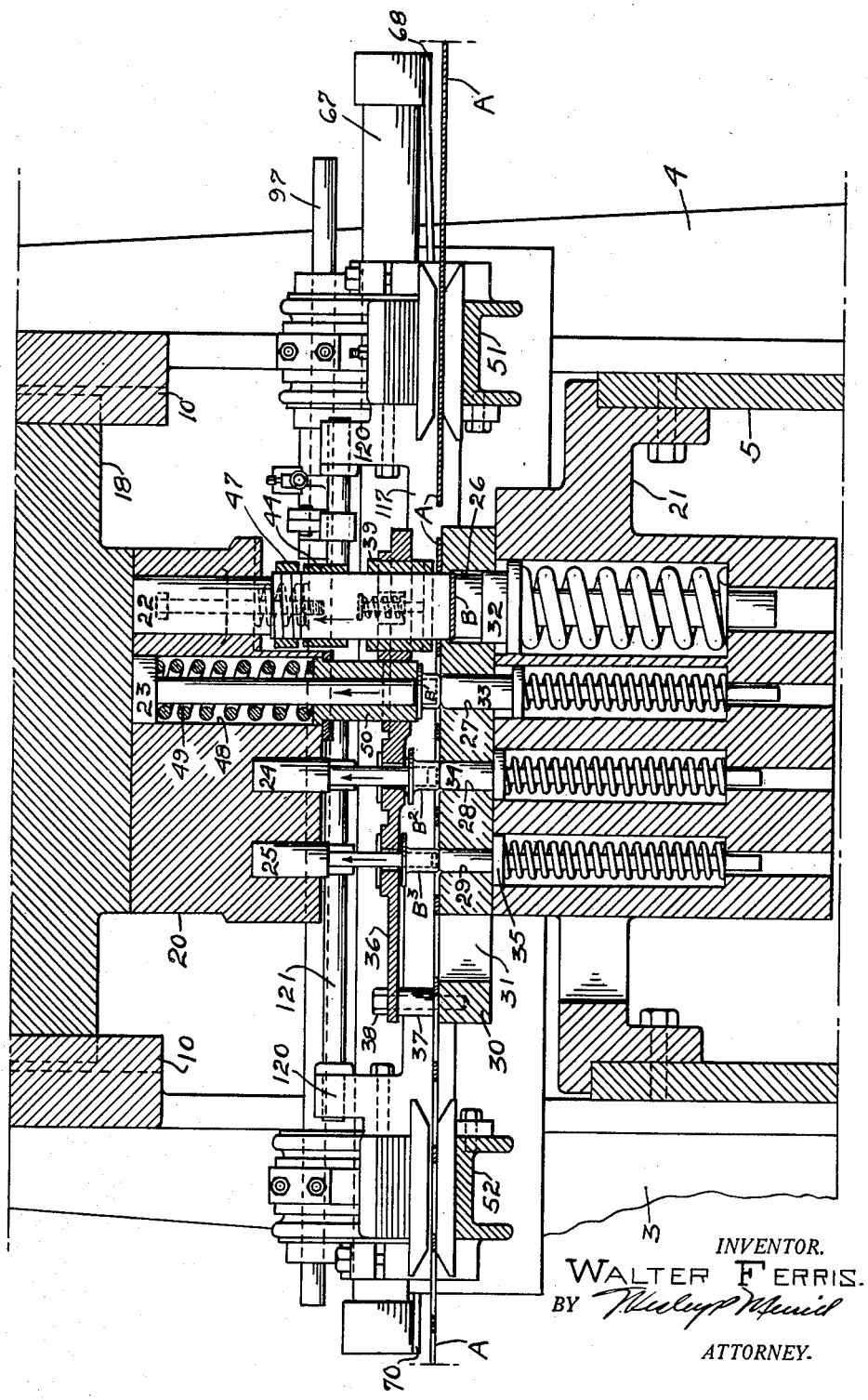

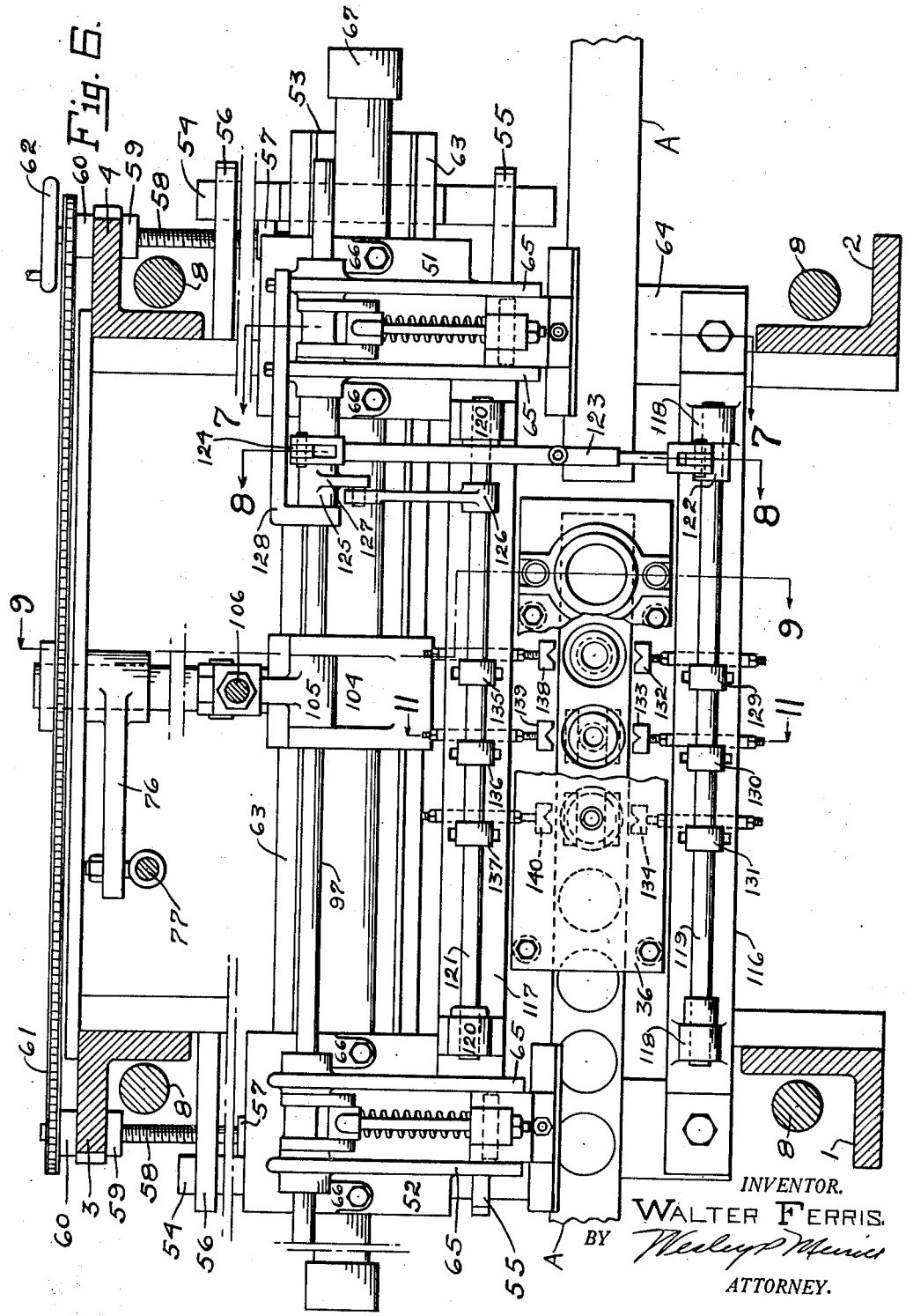

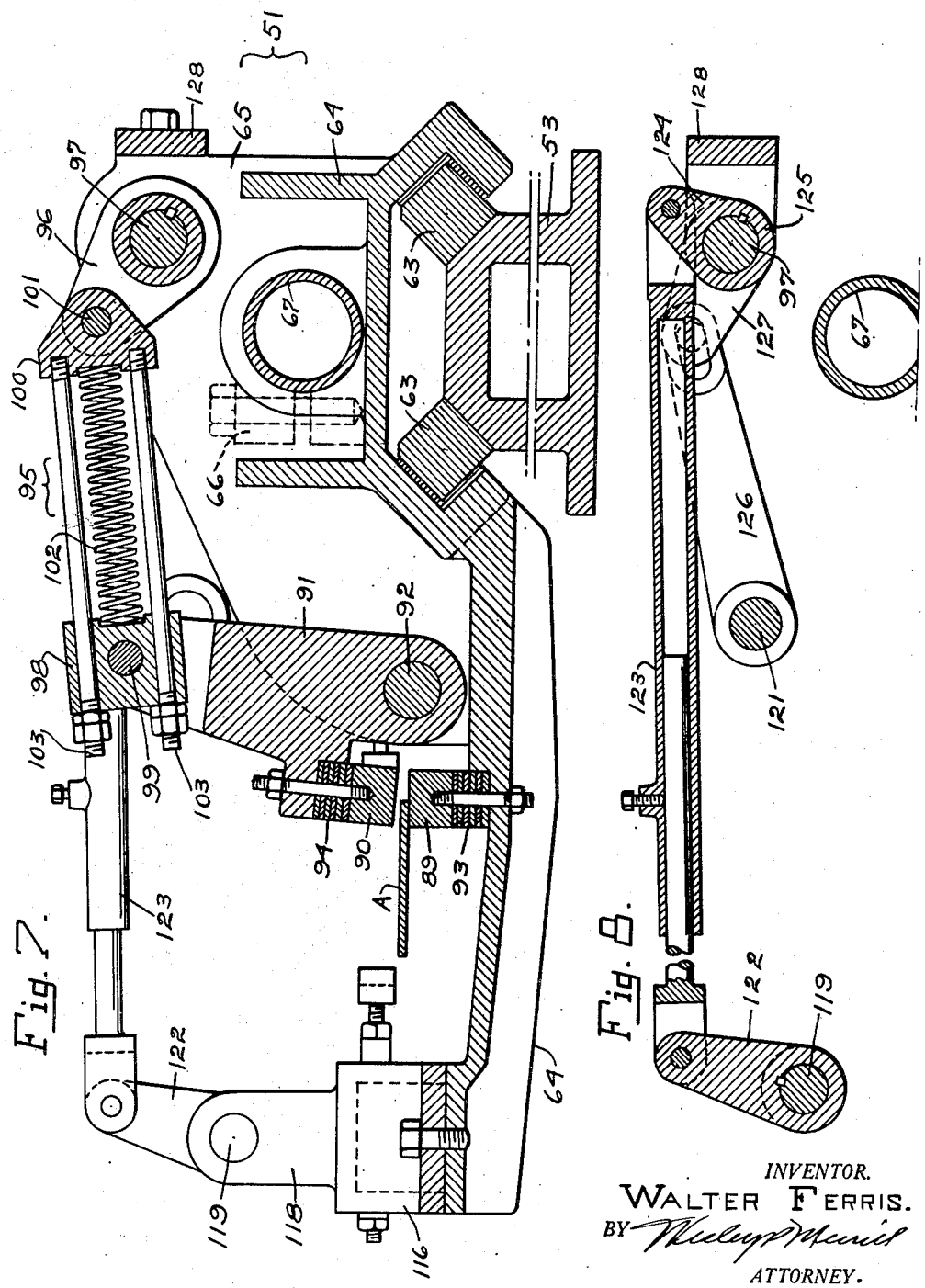

Aug. 27, 1935.  W. FERRIS  2,012,423
BLANKING AND FORMING PRESS AND METHOD OF FORMING BLANKS
Filed Nov. 25, 1932   9 Sheets-Sheet 8
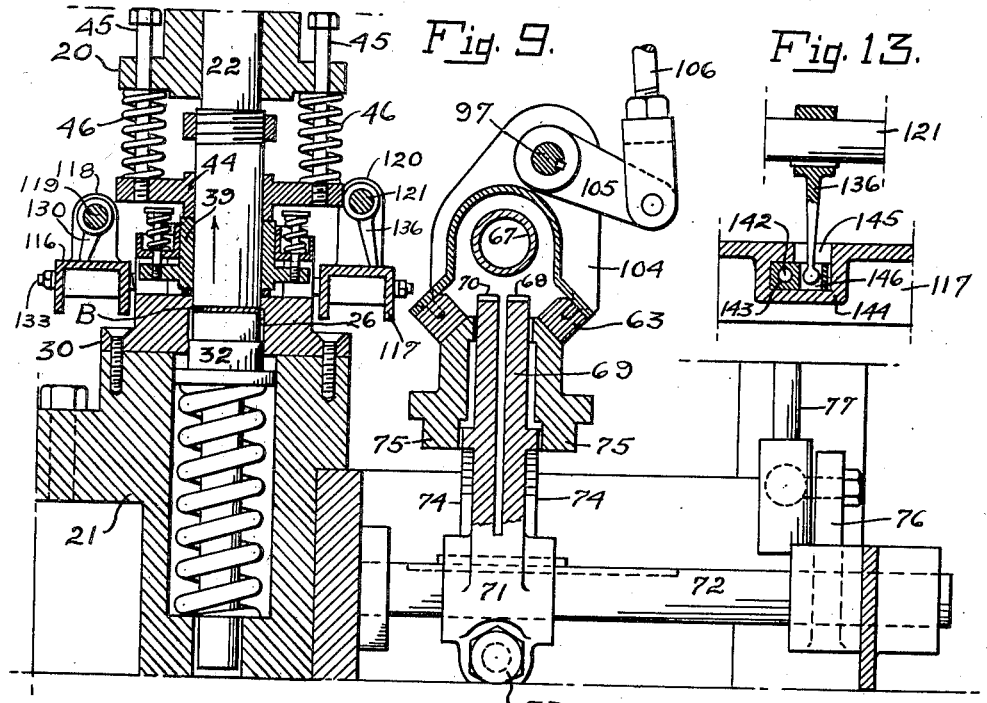
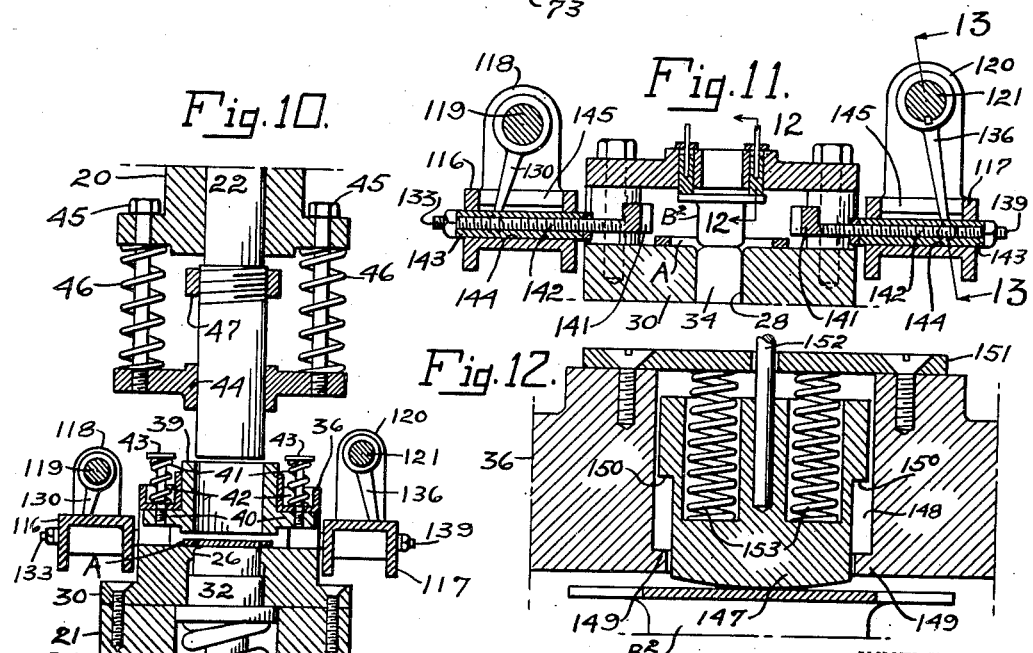
INVENTOR.
WALTER FERRIS.
BY Wesley P. Merrill
ATTORNEY.

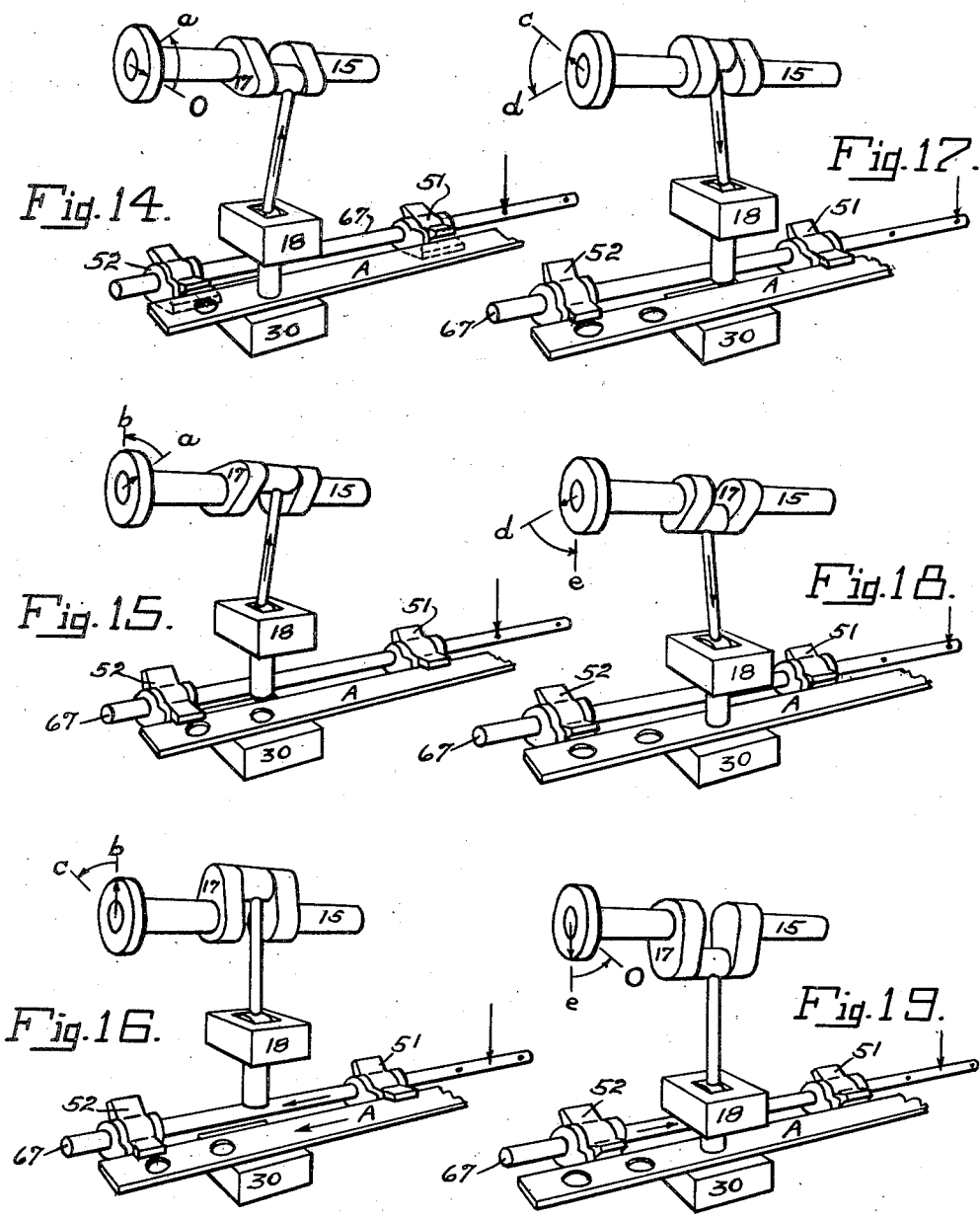

Patented Aug. 27, 1935

2,012,423

UNITED STATES PATENT OFFICE 2,012,423

BLANKING AND FORMING PRESS AND METHOD OF FORMING BLANKS

Walter Ferris, Milwaukee, Wis.

Application November 25, 1932, Serial No. 644,237

22 Claims. (Cl. 113—40)

This invention relates to presses of the type employed to form articles from sheets or strips of material.

In forming articles from a sheet or strip, it is customary to stamp flat pieces from the sheet or strip and then handle each piece separately to and from the drawing or forming dies which shape it into the desired form. However, articles of a particular shape have heretofore been produced by stamping flat pieces from a sheet or strip and then returning each piece to its original position in the sheet or strip to be moved thereby to and from successive forming or drawing dies, but it is necessary that the articles have a particular shape in order to be carried by the sheet or strip.

The present invention has as an object to provide a press which will stamp pieces from a sheet or strip and will move these pieces with the sheet or strip but independent thereof.

Another object is to provide a press with mechanism for moving a piece stamped from a sheet or strip with the sheet or strip but independent thereof.

Another object is to provide a press which will form articles from a sheet or strip and move the articles with the sheet or strip irrespective of the shape of the articles.

Another object is to provide a press with mechanism which will move an article from one die to another with a sheet or strip and retain the article in position until engaged by the die.

Another object is to provide a press of this character which is susceptible of close adjustment and control.

Other objects and advantages will appear hereinafter.

According to the invention in its general aspect, a press is provided with dies for stamping and forming articles from a sheet or strip, a feed for advancing the sheet or strip through the press intermittently, and means for passing the articles from one die to another in unison with the sheet or strip but independent thereof.

The invention is exemplified by the press illustrated in the accompanying drawings in which the views are as follows:

Fig. 5 is a vertical section taken on the line 5—5 of Fig. 2 and showing the dies and feeding mechanism.

Fig. 6 is a sectional plan view taken substantially on the line 6—6 of Fig. 1 but with the upper dies omitted and a part of the stripper plate broken away.

Fig. 7 is a transverse section through the feeding and transfer mechanisms, the view being taken substantially on the line 7—7 of Fig. 6.

Fig. 8 is another transverse section through the feeding and transfer mechanisms, the view being taken substantially on the line 8—8 of Fig. 6.

Fig. 9 is a transverse section taken on the irregular line 9—9 of Fig. 6 and showing the punch in the position occupied after it has stamped a blank from the work and has started upward.

Fig. 10 is a view similar to Fig. 9 but showing the punch after it has reached the top of the stroke.

Fig. 11 is a transverse section taken on the line 11—11 of Fig. 6 and showing a part of the transfer mechanism which moves the blank from one die to another.

Fig. 12 is a section taken on the line 12—12 of Fig. 11 and showing one of two detents which hold the blank in position until engaged by the transfer mechanism.

Fig. 13 is a section taken on the line 13—13 of Fig. 11.

Figs. 14 to 19 are diagrams showing the relative positions of certain parts of the press during different points in a cycle of operation.

Figure 1:
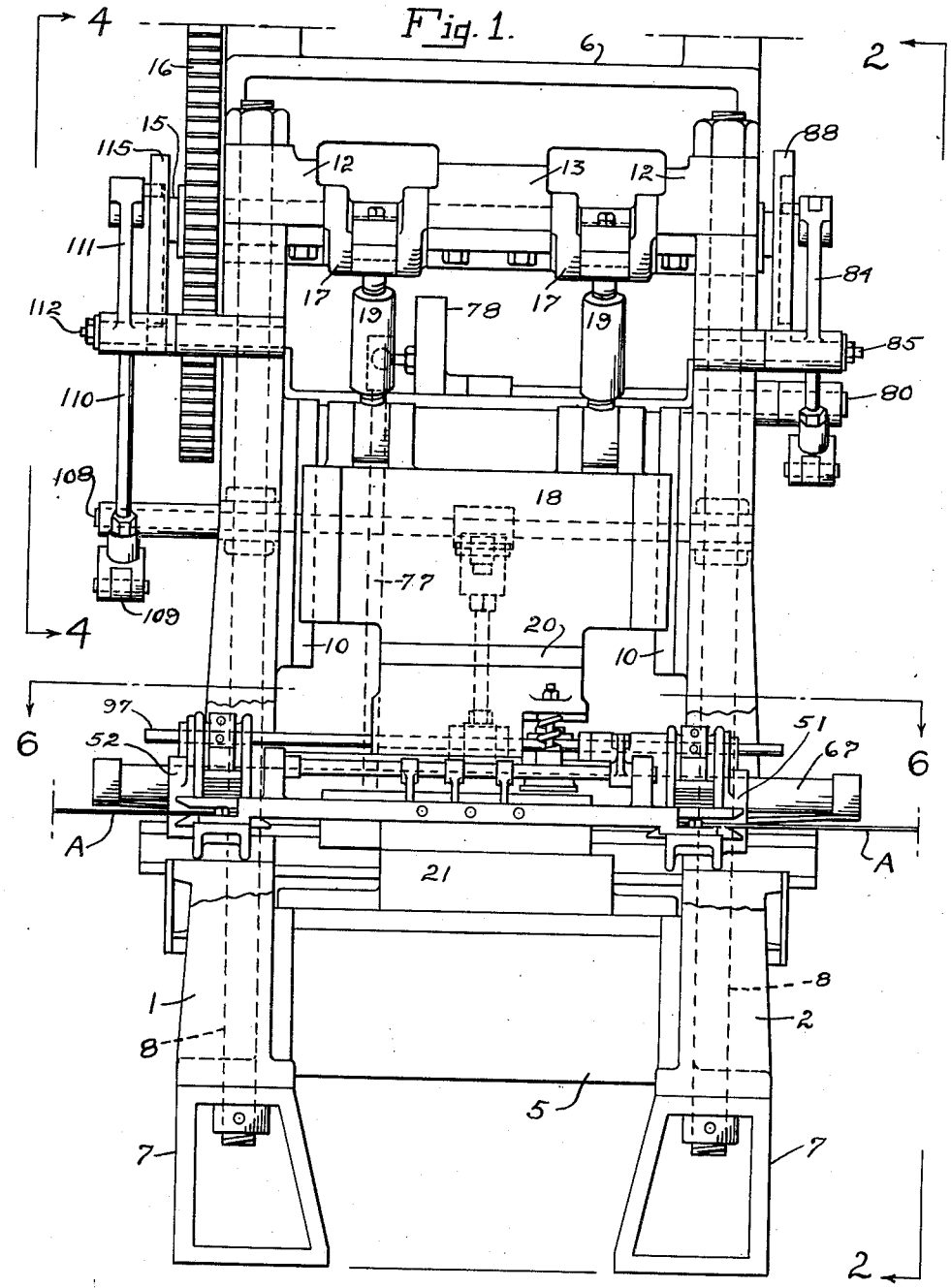
Fig. 1 is a front view of the press.

The press is provided with mechanism for stamping and forming blanks from a sheet or strip, mechanism for feeding the sheet or strip through the press, and mechanism for moving the blanks through the press in synchronism with the sheet or strip but independent thereof.

The several mechanisms are carried by a four column frame which has two angular front posts 1 and 2 and two angular rear posts 3 and 4 arranged at the corners thereof and connected to each other at their lower ends by a lower girder or bed 5 and at their upper ends by a top girder 6.

The frame is supported at each of its corners upon a pedestal 7 arranged beneath the corner post and fastened thereto by a tension rod 8 which extends upward between the legs of the corner post and fastens the top girder 6 to the upper end thereof.

The tension rods 8 sustain the thrust of the stamping and forming mechanism and retain the top girder 6 securely in position.

The front and rear posts upon each side of the frame are connected to each other at the upper ends thereof by a strut or web 9 which has a guide 10 attached to the lower edge thereof and connected at its lower end to a bracket 11 fastened to the rear post intermediate the ends thereof.

The strut 9 and the bracket 11 upon each side of the frame are shown as being welded to the corner posts and to the guide 10 to form therewith a unitary side frame, but they may be fastened together in any other conventional manner.

The top girder 7 is provided at each of its ends with a bearing 12 and at its center with a bearing 13 which are divided horizontally and have their caps arranged upon the under sides thereof and retained in position by suitable bolts, the cap of each end bearing 12 being arranged in a notch or recess 14 formed in the strut 9 and extending downward from the upper edge thereof.

The bearings 12 and 13 have a crankshaft 15 journaled therein and provided upon its left end with a gear 16 by means of which it is rotated from a suitable source of power, such as a motor (not shown) arranged upon the top girder 6.

The crankshaft 15 is provided with two cranks 17 each of which is arranged between an end bearing 12 and the center bearing 13 with its crank pin in axial alinement with the pin of the other crank 17.

The crankshaft 15 reciprocates a platen 18 which is arranged between and guided by the guides 10 and connected to the crankshaft by two connecting rods 19 each of which has its lower end pivoted to the top of the platen 18 and its upper end journaled upon the pin of one of the cranks 17.

The connecting rods 19 are shown as being of the turn-buckle type in order that they may be lengthened or shortened to thereby vary the clearance between the platen 18 and the bed 5 when the platen is at the bottom of its stroke.

The plate 18 has an upper die block 20 attached to the under side thereof to carry a set of upper dies which cooperate with a set of lower dies carried by a lower die block 21 supported by the bed 5. As shown in Fig. 5, the upper die block 20 carries a male blanking die or punch 22 and three male drawing dies or punches 23, 24 and 25 which are arranged in alinement with each other and with the blanking punch 22.

The punches 22, 23, 24 and 25 cooperate, respectively, with four female dies 26, 27, 28 and 29 shown as being formed in a single die plate 30 which is attached to the top of the lower die block 21 and provided with a discharge opening 31 at the left of the dies and in alinement therewith.

The lower die block 21 has a bore and a counterbore formed therein in axial alinement with each of the female dies to receive an ejector for ejecting the work from that die. The die 26 is provided with an ejector 32, the die 27 is provided with an ejector 33, the die 28 is provided with an ejector 34, and the die 29 is provided with an ejector 35.

Each ejector comprises a plunger which is fitted in the die and normally has its upper end substantially flush with the top of the die plate, a collar which is fixed on the lower end of the plunger and limits the upward movement thereof, a tail rod which is connected to the plunger and extends downward through the counterbore and into the bore in the die block, and a helical compression spring which urges the plunger upward and encircles the tail rod between the collar on the plunger and the bottom of the counterbore in the die block.

When the stamping and drawing punches move downward, they force blanks into the dies and move the plungers of the ejectors downward. Then, when the punches move upward, the plungers are forced upward by the springs and strip the blanks from the dies.

The die plate 30 carries a stripper plate 36 which is spaced therefrom by separators 37 and rigidly secured thereto by bolts 38 which pass through the stripper plate and the separators and are threaded into the die plate.

The stripper plate 36 is provided with suitable openings to permit the punches to pass therethrough into the female dies, and as shown in Figs. 9 and 10, one of these openings contains a presser foot 39 which encircles the stamping punch 22 and is provided near its lower end with two lugs 40.

The presser foot 39 is urged upward by two springs 41 arranged in recesses 42 formed in the stripper plate 36 at the front and rear of the presser foot.

Each spring 41 has its lower end in engagement with the bottom of the recess 42 and its upper end in engagement with the head of a bolt 43 which extends downward through the spring 41 and the stripper plate 36 and is threaded into the lug 40.

The springs 41 tend to hold the lugs 40 against the bottom of the stripper plate 36 but permit the presser foot 39 to be moved downward against any work which may be fed between the punch 22 and the die 26 and which is shown as a relatively narrow sheet or strip A which is advanced intermittently through the press by the feed mechanism.

The presser foot 39 is urged downward against the strip A during the down stroke of the platen 18 by a pressure ring 44 which encircles the punch 22 above the presser foot.

The pressure ring 44 is supported from the upper die block by two bolts 45, and it is urged away from the die block 20 by two helical compression springs 46 which are arranged upon the bolts 45 and are considerably stronger than the springs 41 which support the presser foot 39.

During the down stroke of the platen 18, the pressure ring 44 engages the presser foot 39 and forces it downward against the strip A, the springs 45 are compressed and exert pressure upon the strip A through the pressure ring 44 and the presser foot to hold the strip in position and to prevent it from buckling, the punch 22 then stamps a blank B from the work and, just before the punch 22 reaches the end of its down stroke, a collar 47 carried thereby engages the pressure ring 44 and exerts thereon a high pressure which is transmitted through the presser foot 39 to the work to flatten it and remove therefrom any deformation caused by the stamping operation. The collar 47 is secured to the punch 22 in an adjusted position as by being threaded thereon.

As the punch 22 passes through the work A, it presses the blank B against the plunger of the ejector 32 (Fig. 5) and forces the plunger downward against the action of its spring. Then, when the punch 22 moves upward, the ejector 32 raises the blank B with the punch and forces it back into the opening in the work A from which it was stamped, the presser foot 39 holding the strip A stationary and permitting the punch 22 to be withdrawn therefrom and the blank B inserted therein.

After the blank B has been replaced in the strip A, it is advanced with the strip A into alinement with the punch 23 which has its head arranged in engagement with the bottom of the platen 18 and fitted in a bore 48 formed in the upper die block 20.

The bore 48 contains a helical compression spring 49 which encircles the punch 23 between its head and a presser sleeve 50 which is fitted upon the lower end of the punch 23 and has its upper end enlarged and fitted in the lower end of the bore 48. Suitable means are provided for preventing the spring 49 from ejecting the sleeve 50 from the bore 48, such as a keeper plate fastened to the bottom of the upper die block 20 and engaging the under side of the enlarged upper end of the sleeve 50.

When the platen 18 descends, the presser sleeve 50 is urged by the spring 49 against the blank B and presses its margin firmly against the top of the die plate 30. Then the punch 23 forces the central part of the blank B into the die 27 and forms it into a shaped blank or partly formed article B¹ which is shown in the drawings as being substantially cylindrical and having an upper rim or flange, the spring 49 being compressed as the punch 23 moves downward into the die 27.

As the punch 23 forces the blank into the die 27, it depresses the plunger of the ejector 33. Then, when the platen 18 rises and withdraws the punch 23, the spring 49 holds the presser sleeve 50 against the blank B¹ and keeps it stationary until the punch 23 has been withdrawn therefrom and then the presser sleeve 50 rises and the ejector 33 strips the blank B¹ from the die 27 and raises it in unison with the presser sleeve 50 into its initial position in the skeleton of the strip.

The ejector 33 holds the flange of the blank B¹ in contact with the presser sleeve 50 until its bottom is substantially flush with the top of the die plate 30 at which time it is in position to be moved into registry with the die 28 by transfer mechanism to be presently described.

The blank B¹ is then moved with the strip A but independent thereof into registry with the die 28, the platen 18 descends and the punch 24 forces the blank B¹ into the die 28 and forms it into a more nearly completed article B².

As the punch 24 forces the blank into the die 28, it moves the plunger of the ejector 34 downward. Then, when the platen 18 rises and withdraws the punch, the ejector 34 strips the blank B² from the die 28 and the blank moves upward with the punch until it engages the stripper 36 which prevents further upward movement thereof and permits the punch to be withdrawn therefrom. The blank B² is now disposed in the same opening in the strip A from which it was initially stamped.

The transfer mechanism then advances the blank B² and the strip A in unison but independent of each other until the blank B² is in registry with the die 29, and then the platen descends and the punch 25 forces the blank into the die 29 and forms it into a finished article B³.

The punch 25 depresses the plunger of the ejector 35 and, when the punch rises, the ejector 35 strips the article B³ from the die 29. The article B³ rises with the punch 25 until it engages the stripper 36 which prevents further upward movement thereof and permits the punch to be withdrawn therefrom.

The finished article is now arranged in the same opening in the skeleton of the strip A from which the blank B was stamped, and it is in position to be engaged by the transfer mechanism which advances it with the strip A but independent thereof. When the article arrives over the discharge opening 31 in the die plate 30, the transfer mechanism releases it and permits it to fall through the opening 31 and be removed from the press in any suitable way, as by sliding down a chute in the customary manner.

The strip A is advanced intermittently through the press by feeding mechanism which is similar to the feeding mechanism employed in the self-feeding press disclosed in the co-pending application of Walter Ferris, John P. Ferris and George L. Heiden, Serial No. 570,822, filed October 24, 1931. That feeding mechanism, however, is driven hydraulically while the present feeding mechanism is driven mechanically.

The feeding mechanism is provided with two grippers 51 and 52 (Figs. 6 and 7) which reciprocate transversely of the press upon a track 53 and feed the work through the press in successive steps. The gripper 51 is arranged at the right of the lower die block 21 to feed the work into and through the press, and the gripper 52 is arranged at the left of the die block 21 to assist the gripper 51 in feeding the work through the press and to remove the skeleton of the work from the press.

The track 53 extends the full width of the press and has each of its ends supported upon and fastened to a slide 54 (Figs. 2 and 6) which is arranged alongside the side frame of the press and supported therefrom.

Each slide 54 is supported near its front end by a support 55 and near its rear end by a support 56 both of which have the inner ends thereof rigidly secured to the press frame and the outer ends thereof provided with suitable openings in which the slide is arranged and adapted to slide therein.

In order that the grippers may be moved forwardly or rearwardly to adjust the same relatively to the dies and thereby enable the press to operate upon work of different widths, each slide 54 has a nut 57 secured to its inner face, and a screw 58 is threaded through the nut 57 and journaled in the rear post of the press frame in which it is retained against axial movement by a collar 59 fixed thereon in engagement with the inside of the corner post and by a sprocket wheel 60 fixed upon its rear end in engagement with the outside of the corner post.

The sprockets 60 are connected to each other by a chain 61, and one of the screws 58 is provided with a handwheel 62 for rotating it and thereby rotating the other screw in unison therewith through the chain 61. Consequently, by turning the wheel 62, the grippers 51 and 52 may be adjusted in unison relatively to the dies to enable them to feed work of different widths through the press.

The track 53 is provided at its top with two rails 63 upon which the grippers 51 and 52 slide transversely of the press in a path parallel to the rows of dies carried by the die blocks 20 and 21.

The grippers 51 and 52 are substantially the same and, as best shown in Figs. 6 and 7, are each provided with a frame 64 which is fitted upon the rails 63 to slide thereon. The frame 64 is provided with two spaced apart vertical webs 65 and a clamp 66 arranged upon the outside of each web.

The grippers 51 and 52 are reciprocated upon the rails 63 by a tubular feed bar 67 which extends through the webs 65 and the clamps 66 of both grippers and to which the grippers are fastened in adjusted positions by the clamps 66.

The feed bar 67 is moved in one direction by a flexible band 68 (Figs. 3 and 9) which has one of its ends fastened to the right end of the bar 67 and its other end fastened to a quadrant 69, and the bar 67 is moved in the opposite direction by a flexible band 70 which has one of its ends fastened to the quadrant 69 and its other end fastened to the left end of the bar 67.

The quadrant 69 is provided with a split hub 71 which is splined upon a rock shaft 72 and retained in adjusted position thereon by a clamping bolt 73.

The shaft 72 is journaled in the press frame below the track 53, and the quadrant 69 extends upward between the rails 63 and is retained in position relatively thereto by two arcuate guides 74 one of which is arranged upon each side of the quadrant to engage an abutment 75 carried by the track 53 upon the underside thereof.

When the track 53 is to be moved forward or rearward to adjust the feed mechanism to a strip of a different width, as previously explained, the bolt 73 is loosened to permit the quadrant 71 to slide along the shaft 72 and is tightened after the quadrant has been placed in its new position.

The shaft 72 is rotated through a predetermined angular distance by a lever 76 which is fixed upon the shaft 72 near the rear end thereof and connected to the lower end of a connecting rod 77 as by means of a ball and socket joint.

The connecting rod 77 (Figs. 2 and 3) has its upper end connected to a slotted lever 78 which is provided with an elongated slot 79 and is fixed upon the left end of a countershaft 80 arranged transversely of the press frame and journaled in bearings carried thereby.

The connecting rod 77 is connected to the lever 78 by a pin 81 the outer end of which forms a ball and socket joint with the upper end of the connecting rod and the other end of which is rigidly clamped in an adjusted position within the slot 79.

The shaft 80 has a lever 82 fixed upon its right end and connected by a connecting rod 83 to the upper end of an idler lever 84 which has its lower end pivoted upon a pin 85 carried by the corner post 2 in a stationary position.

The rod 83 and the idler lever 84 are connected to each other at the upper ends thereof by a cam pin 86 which extends into a cam groove 87 formed in a cam wheel 88 carried by the crankshaft 15 upon the right end thereof.

Figure 2:
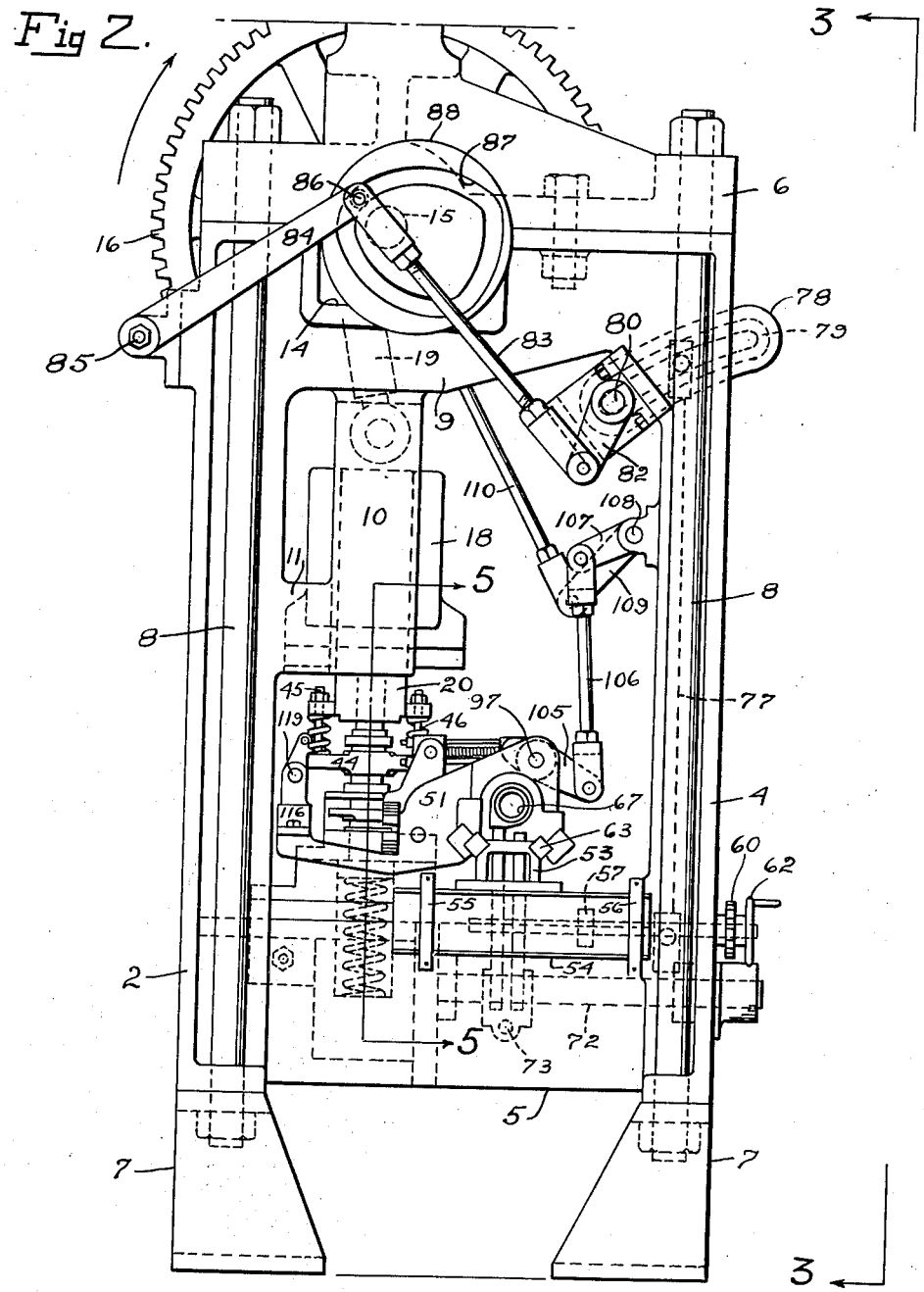
Fig. 2 is an elevation of the right side of the press as indicated by the line 2—2 of Fig. 1.

The idler lever 84 prevents the pin 86 from being carried around the axis of the crankshaft 15 and enables the cam wheel 88 to move it from the position shown in Fig. 2 upward and toward the front of the press during one part of a revolution of the crankshaft and to return it to its initial position during another part of a revolution of a crankshaft, thereby causing the rod 83 to swing the lever 82 and rock the countershaft 80 through a predetermined angular distance in one direction and then return it to its initial position during each revolution of the crankshaft.

When the pin 86 is moved upward and forward by the cam wheel 88, the shaft 80 is rocked in a direction to depress the outer end of the slotted lever 78, thereby depressing the connecting rod 77 and rocking the shaft 72 and the quadrant 69 which pulls upon the flexible band 68 and moves the feed bar 67 and the grippers 51 and 52 to the left.

When the pin 86 is moved back to the position shown in Fig. 2, the shaft 80 is rocked in the opposite direction to raise the outer end of the slotted lever 78, thereby raising the connecting rod 77 and rocking the shaft 72 and the quadrant 69 in the opposite direction and causing the flexible band 70 to pull the grippers 51 and 52 to the right.

The grippers are thus advanced and retracted during each revolution of the crankshaft 15, and the distance through which they are reciprocated may be varied by moving the pin 81 along the slot 79 to thereby vary the angular distance through which the shaft 72 is rocked.

The cam groove 87 is shaped to gradually accelerate the grippers from a stationary position to a high speed and then gradually decelerate them to a stationary position during the movement thereof in each direction. The groove is also shaped so that the grippers are retained in a stationary position for a short period of time at each end of their stroke to permit them to seize the strip A while stationary at one end of the stroke and to release it while stationary at the other end of the stroke.

The strip is seized by each gripper (Fig. 7) between a stationary lower jaw 89, which is carried by the gripper frame 64, and a movable upper jaw 90 carried by a lever 91 which is arranged between the webs 65 and pivoted at its lower end upon a pin 92 carried thereby.

The lower jaw 89 is ordinarily bolted in position and provided with fillers 93 which may be varied as to number or thickness to adjust the top of the jaw relatively to the top of the die plate 30.

The upper jaw 90 is ordinarily bolted in position and provided with fillers 94 which may be varied as to number or thickness to adjust the bottom of the jaw relatively to the top of the lower jaw.

The lever 91 is rocked upon the pin 92, to move the upper jaw 90 toward and from the lower jaw 89, by an expansible connecting rod 95 which connects the upper end of the lever 92 to a crank 96 carried by a gripper shaft 97 extending through the web 65 of both grippers and journaled in suitable bearings carried thereby.

The connecting rod 95 consists of a thrust block 98 which is arranged in the bifurcated upper end of the lever 91 and is pivoted thereto by a pin 99, a thrust block 100 which is arranged in the bifurcated outer end of the crank 96 and pivoted upon the crank pin 101 thereof, a helical compression spring 102 which is arranged between the thrust blocks 98 and 100 and urges them away from each other, and two tension rods 103 which are fastened to the thrust block 100, extend loosely through the thrust block 98 and are provided upon the outer ends thereof with suitable nuts which engage the thrust block 98 to limit the action of the spring 102 and to swing the upper end of the lever 91 toward the shaft 97 to open the gripper.

The crank 96 is splined upon the shaft 97 and arranged between the webs 65 to be moved thereby along the shaft 97 as the gripper reciprocates.

The shaft 97 is supported at or near its center by a stationary bearing bracket 104 which is fastened to the rails 63 of the track 53 and provided with two vertical webs in which the shaft 97 is journaled, as shown in Figs. 6 and 9.

The shaft 97 is rocked or rotated through a limited angular distance in each direction by a lever 105 which has its hub fixed thereon and arranged between the webs of the bearing bracket 104 to restrain the shaft from axial movement.

Figure 3:
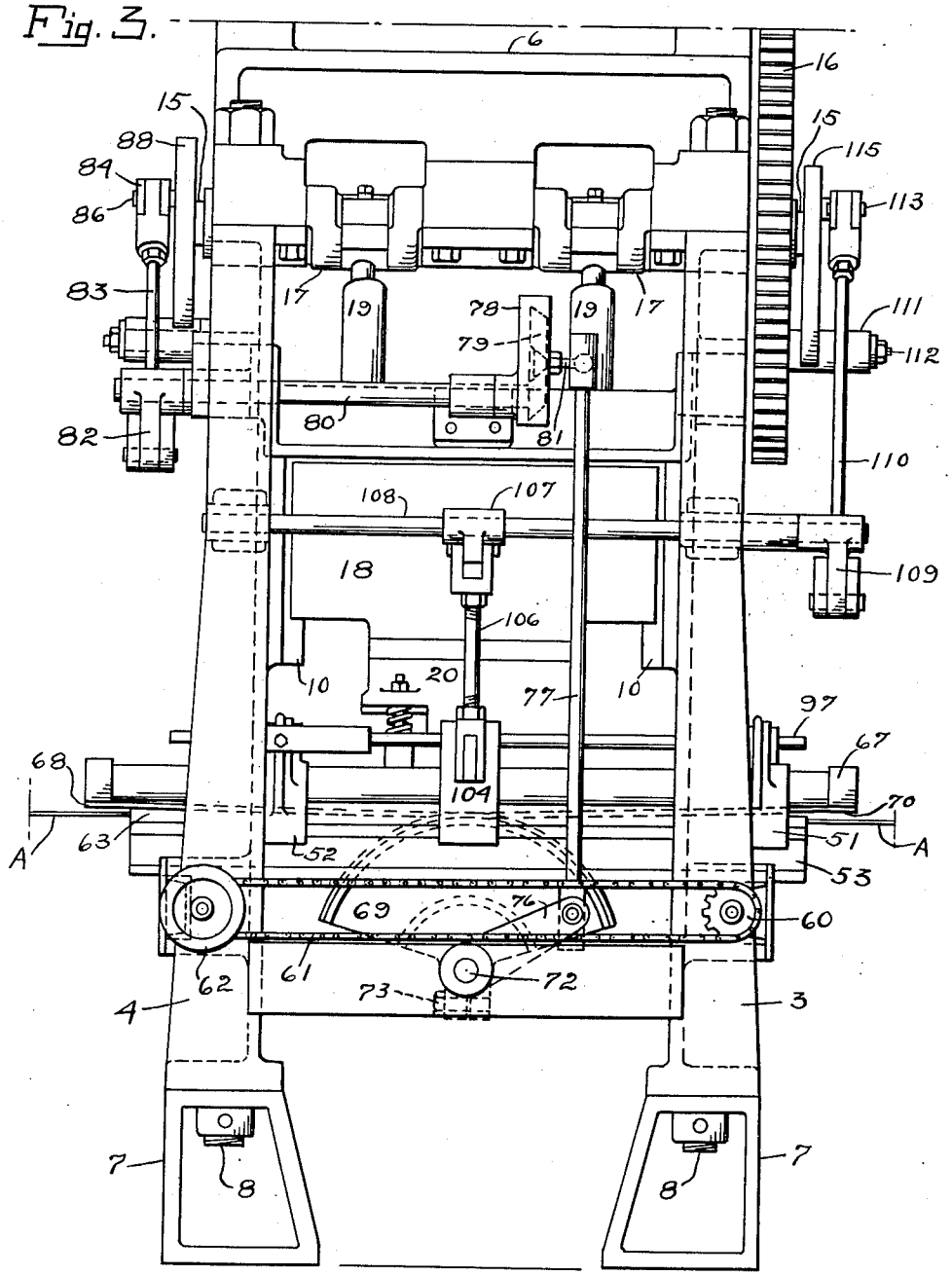
Fig. 3 is a rear view of the press as indicated by the line 3—3 of Fig. 2.
Figure 4:
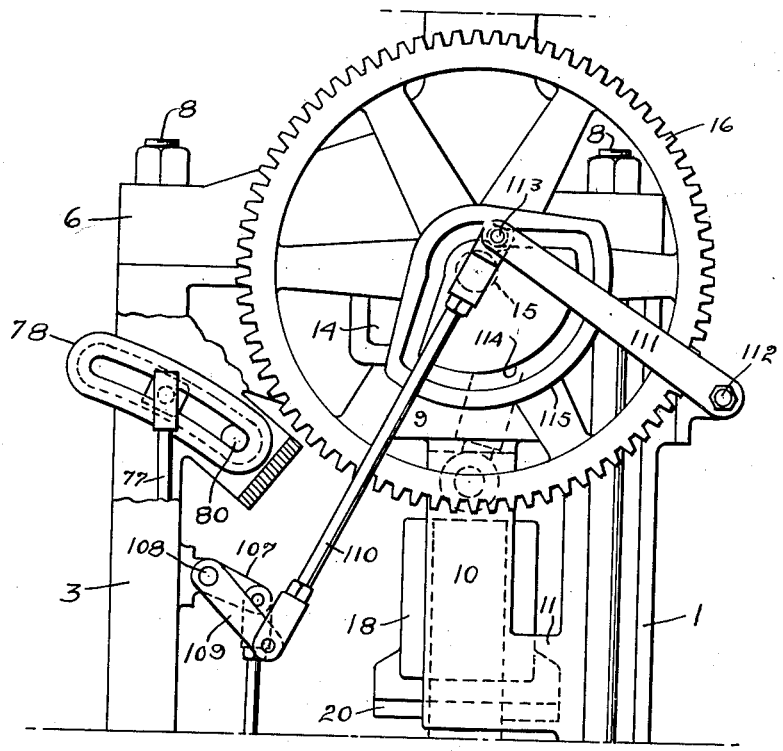
Fig. 4 is an elevation of the left side of the press as indicated by the line 4—4 of Fig. 1.

The lever 105 extends rearward and downward from the shaft 97 and has its rear end connected by a connecting rod 106 to the outer end of a lever 107 which is fixed upon a countershaft 108 journaled in suitable bearings carried by the corner posts 3 and 4, as shown in Figs. 2, 3, and 4.

The shaft 108 extends beyond the left side of the press frame and has a lever 109 fixed upon its outer end and connected by a connecting rod 110 to the upper end of an idler lever 111 which has its lower end pivoted upon a pin 112 carried by the corner post 1 in a stationary position.

The connecting rod 110 and the idler lever 111 are connected to each other at the upper ends thereof by a cam pin 113 which extends into a cam groove 114 formed in a cam wheel 115 carried by the crankshaft 15 upon the left end thereof.

The idler lever 111 prevents the pin 113 from being carried around the axis of the crankshaft 15 and enables the cam wheel 115 to move it from the position shown in Fig. 4 upward and toward the front of the press during one part of a revolution of the crankshaft and to return it to its initial position during another part of the revolution of the crankshaft, thereby causing the rod 110 to swing the lever 109 and rock the countershaft 108 through a predetermined angular distance in one direction and then return it to its initial position during each revolution of the crankshaft.

When the cam pin 113 is moved upward and forward by the cam wheel 115, the countershaft 108 is rocked in a clockwise direction as viewed from the right side of the press, the lever 107 through the connecting rod 106 raises the outer end of the lever 105 and rocks the shaft 97 in a counter-clockwise direction, and the outer end of the crank 96 moves downward and swings the upper end of the lever 91 forward to move the jaw 90 toward the jaw 89 and grip the work strip A therebetween.

As the outer end of the crank 96 (Fig. 7) moves downward, the spring 102 moves the upper end of the lever 91 forward until the jaw 90 engages the strip A and then the spring is compressed and the tension rods 102 slide through the thrust block 98, the spring 102 causing the jaws to exert a gradually increasing pressure upon the strip A.

After the cam pin 113 reaches its uppermost position, it is retained by the cam groove 114 in that position to hold the grippers closed while the strip is being advanced through the press, the approximate shape of the cam groove being shown in Fig. 4.

After the grippers have been reciprocated to advance the strip A, the cam wheel 115 moves the cam pin 113 downward to its initial position, thereby operating the jaw actuating mechanism in the opposite direction and opening the grippers to release the strip.

During reversal of the gripper operating mechanism, the jaws of each gripper are held in engagement with the strip A by the spring 102 (Fig. 7) until the crank 96 has been rotated far enough to bring the nuts upon the rods 103 into engagement with the thrust block 98 and then the upper end of the lever 91 is swung toward the shaft 97 to raise the jaw 90 out of engagement with the strip A.

The gripper operating mechanism also operates the transfer mechanism which reciprocates with the grippers and moves the partly finished articles B¹ and B² from one die to another and removes the finished article B³ from the press.

The transfer mechanism has a front bar 116, which is carried by the grippers and has one of its ends fastened to the front end of the frame 64 of the gripper 51 and its other end fastened to the front end of the frame 64 of the gripper 52 as shown in Figs. 6 and 7, and a rear bar 117 which is carried by the grippers 51 and 52 and has its ends fastened to adjacent webs 65 thereof as shown in Fig. 5.

The front bar 116 is provided near each of its ends with a bearing 118 to support a shaft 119 at each end thereof and to restrain the same from axial movement, and the rear bar 117 is provided near each of its ends with a bearing 120 to support a shaft 121 at each end thereof and to restrain the same from axial movement.

The shaft 119 is rocked through a predetermined angular distance by a lever 122 (Fig. 8) which is fixed thereon and extends upward and rearward therefrom and has its upper end connected by an adjustable connecting rod 123 to the upper end of a lever 124 which extends upward and rearward from an elongated hub 125 splined upon the gripper shaft 97.

The shaft 121 is rocked at the same time but in the opposite direction by a lever 126 which is fixed thereon and extends rearward therefrom and has its rear end connected by a pin and slot connection to the front end of a lever 127 carried by the hub 125 and extending forward therefrom.

The hub 125 (Fig. 6) of the levers 124 and 127 is fixed to reciprocate with the grippers by an angular retainer 128 which has one of its legs fastened to the rear edges of the webs 65 of the gripper 51 and its other leg arranged in engagement with the end of the hub 125 and provided with a suitable opening through which the shaft 97 passes.

When the gripper shaft 97 is rotated in a counterclockwise direction to close the grippers, the lever 124 (Fig. 8) moves the connecting rod 123 and the upper end of the lever 122 forward and thereby rotates the shaft 119 in a counter-clockwise direction as viewed from the right side of the press, and the lever 127 simultaneously depresses the end of the lever 126 and thereby rotates the shaft 121 in a clockwise direction.

When the gripper shaft 97 is rotated in a clockwise direction to open the grippers, the shaft 119 is rocked in a clockwise direction and the shaft 121 is rocked in a counter-clockwise direction.

The shaft 119 (Fig. 6) has three levers 129, 130 and 131 fixed thereon and extending downward to operate, respectively, three transfer fingers 132, 133 and 134 which are carried by the front bar 116, and the shaft 121 has three levers 135, 136 and 137 fixed thereon and extending downward to operate, respectively, three transfer fingers 138, 139 and 140 which are carried by the rear bar 117. Each finger carried by the front bar 116 is arranged opposite to and in alinement with one of the fingers carried by the rear bar 117 and forms therewith a pair of fingers which coact to move one of the finished or partly finished articles when the grippers are reciprocated.

As the fingers 132, 133, 134, 138, 139 and 140 and associated parts are substantially identical, a description of but one will be given and like parts of different fingers indicated by like reference numerals.

Referring now more particularly to Figs. 11 and 13, each finger is arranged a sufficient distance above the die plate 30 to clear the strip A and is provided upon its inner end with a head 141 to engage the finished or partly finished article which it is to move through the press.

The head 141 is carried by a stem 142 which extends through a slide block 143 and is threaded to permit the head to be adjusted relatively to the article which it is to engage. The stem 142 is retained in adjusted position by nuts threaded thereon and in engagement with the ends of the slide block.

The slide block 143 is fitted in a guide 144 one of which is carried by each of the supporting bars 116 and 117 beneath each of the levers 129, 130, 131, 135, 136 and 137. The bars 116 and 117 each have a slot 145 formed in the upper wall thereof above each guide 144 to permit the lever thereabove to extend into a socket 146 carried by the slide block 143, the lever preferably being provided upon its lower end with a ball to form a ball and socket joint with the socket 146.

As best shown in Fig. 11, rotation of the shaft 119 in a counter-clockwise direction and rotation of the shaft 121 in a clockwise direction will advance the fingers of each pair toward each other to seize the article therebetween, and rotation of these shafts in the opposite directions will retract the fingers to release the article.

When the feed bar 67 is at the right end of its stroke as shown in Figs. 5 and 6, the fingers 132 and 138 are arranged in alinement with the die 27 to engage the article B¹, the fingers 133 and 139 are arranged in alinement with the die 28 to engage the article B², and the fingers 134 and 140 are arranged in alinement with the die 29 to engage the article B³.

Closing the grippers 51 and 52 upon the strip A causes the fingers of each pair to seize the article therebetween. Then, when the grippers are advanced to feed the strip A through the press, the articles are retained in their original positions in respect to the strip and are moved through the press with the strip but independent thereof.

When the feed mechanism reaches the end of its advance stroke, the fingers 132 and 138 will have moved the partly finished article B¹ into alinement with the punch 24 and the die 28, the fingers 133 and 139 will have moved the partly finished article B² into alinement with the punch 25 and the die 29, and the fingers 134 and 140 will have moved the finished article B³ into alinement with the discharge opening 31 in the die plate 30. Then, when the grippers are opened and thereby cause the fingers to be retracted, the finished article B³ will fall through the discharge opening 31 and the partly finished articles B¹ and B² will be in position to be forced into the dies 28 and 29, respectively, by the punches 24 and 25 when the platen 18 descends.

In order to retain the articles in position above the dies 28 and 29 after they have been released by the transfer fingers and before being engaged by the punches 24 and 25, and to retain these articles in position after they have been ejected from the dies 28 and 29 and before being engaged by the transfer fingers, the stripper plate 36 is provided at both the front and rear of each of the dies 28 and 29 with a friction detent 147 which engages the article therebeneath and presses it downward against the plunger of the ejector which has just forced it from the die.

As shown in Figs. 11 and 12, the detent 147 is arranged in an opening 148 which is formed in the stripper plate 36 and provided at each of its lateral sides with a flange 149 to limit the downward movement of the detent 147 by engaging a shoulder 150 one of which is provided upon each lateral side thereof.

The opening 148 is closed at its top by a plate 151 having a small opening at its center to permit the passage therethrough of a guide pin 152 which is fastened to the detent 147 and guides it for vertical reciprocation within the opening 148.

The detent 147 is urged downward by two springs 153 which abut the underside of the plate 151 and are arranged in suitable recesses formed in the detent.

The springs 153 are long enough to urge the detent 147 downward until the shoulders 150 engage the flanges 149 at which time the bottom of the detent is spaced from the die plate 30 at a distance which is slightly less than the height of the article which is to be fed beneath it, the bottom of the detent being rounded transversely of the press to permit an article to be fed thereunder.

The springs 153 are resilient enough to permit the detent 147 to be raised sufficiently to accommodate the article after it has been operated upon by the die alongside of which the detent is positioned.

When the grippers are closed, the fingers 132 and 138 engage the article B¹, the fingers 133 and 139 engage the article B² and the fingers 134 and 140 engage the article B³, the press being so timed that the fingers 132 and 138 engage the article B¹ before the sleeve 50 moves out of engagement therewith.

When the grippers are advanced, the fingers 134 and 140 move the article B³ from the die 29 to the discharge opening 31 and the detents 147 alongside the die 29 are urged downward by their springs; the fingers 133 and 139 move the article B² from the die 28 to the die 29 and the detents 147 alongside the die 28 are urged downward by their springs and the detents 147 alongside the die 29 are engaged by the article B²; the fingers 132 and 138 move the article B¹ from the die 27 to the die 28 and into engagement with the detents alongside thereof; and the blank B is moved by the strip A over the die 27.

When the grippers are opened and the fingers retracted, the article B³ falls through the discharge opening 31 and the articles B¹ and B² are held by the detents 147 in the correct positions to be engaged by the punches 24 and 25.

When the platen 18 descends, the punch 23 forms the blank B into an article B¹, the punch 24 forms the article B¹ into an article B², and the punch 25 forms the article B² into an article B³. Then, when the platen rises, the articles are ejected from the dies, the ejector 33 urging the article B¹ against the sleeve 50 and the ejectors 34 and 35 urging the articles B² and B³ against the detents 147. The sleeve 50 and the detents 147 thus hold the articles in their exact positions in the strip until they are engaged by the transfer fingers to be moved thereby with the strip but independent thereof.

Assuming that the several mechanisms are in the positions shown in the drawings, that the press is running, and that a work strip A is being fed therethrough, the platen 18 is moving upward and the grippers 51 and 52 are about to close upon the strip A, as indicated schematically in Fig. 14.

During rotation of the crankshaft 15 through the angle O—a, the cam wheel 115 moves the cam pin 113 from the inner concentric part of the cam groove 114 to the outer concentric part thereof and thereby closes the grippers upon the strip A and advances the transfer fingers into engagement with the articles B¹, B² and B³.

At the same time, the cranks 17 raise the platen 18 from the position shown in Fig. 14 to the position shown in Fig. 15 to withdraw the punches from the strip and the articles formed therefrom, and the cam wheel 88 moves the cam pin 86 through the inner concentric part of the cam groove 87 so that the feed bar 67 remains stationary.

During rotation of the crankshaft through the angle a—b, the platen rises from the position shown in Fig. 15 to the top of its stroke as shown in Fig. 16, the cam pin 113 travels along the outer concentric part of the cam groove 114 and holds the grippers closed and the transfer fingers in engagement with the articles, and the cam pin 86 moves along the cam groove 87 from the inner concentric part thereof toward the outer concentric part thereof and moves the feed bar 67 toward the left and advances the strip A and the articles through the press.

During rotation of the crankshaft through the angle b—c, the cranks 17 move the platen downward from the position shown in Fig. 16 to the position shown in Fig. 17, the cam pin 113 travels along the outer concentric part of the cam groove 114 and continues to hold the grippers closed and the transfer fingers in engagement with the articles, and the cam pin 86 moves along the cam groove 87 to the outer concentric part thereof and continues to move the feed bar 67 to the left thereby advancing the blank B over the die 27, the article B¹ over the die 28, the article B² over the die 29 and the article B³ over the discharge opening 31.

During rotation of the crankshaft through the angle c—d, the platen moves downward from the position shown in Fig. 17 to the position shown in Fig. 18 and the punches engage the work, the cam pin 86 moves along the outer concentric part of the cam groove 87 and holds the feed bar 67 stationary, and the cam pin 113 moves from the outer concentric part of the cam groove 114 to the inner concentric part thereof and opens the grippers and retracts the transfer fingers.

During rotation of the crankshaft through the angle d—e, the platen moves from the position shown in Fig. 18 to the bottom of its stroke as shown in Fig. 19 and the punches complete their operations upon the work, the cam pin 113 moves along the inner concentric part of the cam groove 114 and holds the grippers open and the transfer fingers retracted, and the cam pin 86 moves from the outer concentric part of the cam groove 87 toward the inner concentric part thereof and moves the feed bar 67 toward the right.

During rotation of the crankshaft through the angle e—O, the cranks 17 raise the platen 18 to the position shown in Fig. 14, the cam pin 113 moves to the end of the inner concentric part of the cam groove 114 and continues to hold the grippers open and the transfer fingers retracted, and the cam pin 86 moves inward to the end of the inner concentric part of the cam groove 87 and continues to move the feed bar 67 to the right to the position shown in Fig. 14.

The press has now completed a cycle of operation and the several parts are in the positions originally assumed and will start upon the next cycle of operation as the crankshaft continues to rotate.

The cycles follow each other in succession and, when one strip A passes beyond the range of the gripper 51, it is fed through the press solely by the gripper 52 and a new strip A is fed into the press solely by the gripper 51 until it has been advanced thereby into the range of the gripper 52 and then both grippers advance it.

During the above described cycle of operations each blank or work piece B is returned to its original position in respect to the strip A and is moved with and by the strip A into working position over die 27. In this position it is formed into the work piece B¹ and at the next feeding cycle is transported synchronously with, but not in contact with, and by means independent of the strip A into working position over the next succeeding die 28. In this position it is shown as further drawn into a modified form B², but in many cases the work performed at this station might consist in piercing holes in the work piece, or any other desired operation. In any case, the essential fact is that having been formed from the original stamping B into a shape which no longer fits the opening in strip A from which it was stamped, it is nevertheless transported synchronously with strip A and by means independent of strip A, into succeeding working positions.

In some variations of the working dies used on pieces of this character, the deformation of work piece B into formed piece B¹ may not be so complete as to entirely destroy the contact with the edges of the opening from which the piece was stamped. But, nevertheless, this contact is so largely removed that it cannot be relied upon to transport the deformed work piece to the next succeeding working station.

The press herein set forth is susceptible of various modifications without departing from the scope of the invention as hereafter claimed.

The invention is hereby claimed as follows:

1. The method of forming shaped articles from a sheet or strip, comprising advancing a sheet or strip step by step in a given direction between the male die and the female die of each pair of a series of blanking and forming dies, stamping a blank from the sheet or strip, advancing the blank a step with the sheet or strip, forming the blank into a desired shape, and then advancing the shaped blank another step in said direction in unison with the sheet or strip but independent thereof.

2. The method of forming shaped articles from a sheet or strip, comprising advancing a sheet or strip step by step in a given direction through mechanism having blanking and forming dies, stamping a blank from the sheet or strip, then reinserting the blank in the opening in the sheet or strip from which it was stamped, then advancing the sheet or strip and the blank therein a step in said direction, then forming the blank into a desired shape, and then advancing the shaped blank another step in said direction in unison with the strip or sheet but independent thereof.

3. The method of forming shaped articles from a sheet or strip, comprising advancing a sheet or strip step by step in a given direction through mechanism having blanking and forming dies, stamping a blank from the sheet or strip, advancing the blank a step in unison with the sheet or strip, then forming the blank into a desired shape, then returning the shaped blank to its initial position relative to the length of the sheet or strip, and then advancing the shaped blank another step in said direction in unison with the sheet or strip but independent thereof.

4. The method of forming shaped articles from a sheet or strip, comprising advancing a sheet or strip step by step in a given direction through mechanism having blanking and forming dies, stamping a blank from the sheet or strip, then reinserting the blank in the opening in the sheet or strip from which it was stamped, then advancing the sheet or strip and the blank therein a step in said direction, then forming the blank into a desired shape, then returning the shaped blank to its initial position relative to the length of the sheet or strip, and then advancing the shaped blank another step in said direction in unison with the sheet or strip but independent thereof.

5. The method of forming shaped articles from a sheet or strip, comprising advancing a sheet or strip step by step in a given direction between the male die and the female die of each pair of a series of blanking and forming dies, stamping blanks in succession from the sheet or strip, successively advancing the blanks a step with the sheet or strip, successively forming the blanks into a desired shape, successively advancing the shaped blanks another step in said direction with the sheet or strip but independent thereof, and causing each blank during each step to move in unison with the sheet or strip and to be retained in its initial position relative to the length of the sheet or strip.

6. The combination, with a press having dies for stamping blanks from a sheet or strip and other dies for shaping said blanks, of a feed for advancing said sheet or strip step by step in a given direction through said press and between the male die and the female die of each pair of said dies, and means for advancing said shaped blanks in said direction in unison with said sheet or strip but independent thereof.

7. The combination, with a press having dies for stamping blanks from a sheet or strip and other dies for shaping said blanks, of a feed for advancing said sheet or strip step by step in a given direction through said press and between the male die and the female die of each pair of said dies, and means operated by said feed for advancing said shaped blanks in said direction in unison with said sheet or strip but independent thereof.

8. The combination, with a press having dies for stamping blanks from a sheet or strip and other dies for shaping said blanks, of a feed for advancing said sheet or strip step by step in a given direction through said press and between the male die and the female die of each pair of said dies, transfer means for advancing said shaped blanks in said direction from one die to another in unison with said sheet or strip but independent thereof, and means for retaining said shaped blanks accurately in position after being released by said transfer means.

9. The combination, with a press having dies for stamping blanks from a sheet or strip and other dies for shaping said blanks, of a feed for advancing said sheet or strip step by step through said press and between said dies, transfer means carried by said feed and operated thereby to advance said shaped blanks from one die to another in unison with said sheet or strip but independent thereof, and means for retaining said shaped blanks accurately in position after being released by said transfer means.

10. The combination, with a press having female blanking and forming dies arranged therein, of a feed for advancing a sheet or strip step by step across said dies, a punch coacting with a blanking die to stamp a blank from said sheet or strip, means for reinserting said blank in said sheet or strip to be advanced thereby over a forming die, a male die coacting with said forming die to shape said blank, means for returning said shaped blank to its initial position relatively to said sheet or strip, and transfer means for advancing said shaped blank in unison with said sheet or strip but independent thereof.

11. The combination, with a press having female blanking and forming dies arranged therein, of a feed for advancing a sheet or strip step by step across said dies, a punch coacting with a blanking die to stamp a blank from said sheet or strip, means for reinserting said blank in said sheet or strip to be advanced thereby over a forming die, a male die coacting with said forming die to shape said blank, means for returning said shaped blank to its initial position relatively to said sheet or strip, and transfer means operated by said feed for advancing said shaped blank in unison with said sheet or strip but independent thereof.

12. The combination, with a press having female blanking and forming dies arranged therein, of a feed for advancing a sheet or strip step by step across said dies, a punch coacting with a blanking die to stamp a blank from said sheet or strip, means for reinserting said blank in said sheet or strip to be advanced thereby over a forming die, a male die coacting with said forming die to shape said blank, means for returning said shaped blank to its initial position relatively to said sheet or strip, transfer means for advancing said shaped blank in unison with said sheet or strip but independent thereof, and means for retaining said shaped blank accurately in position after being released by said transfer means.

13. The combination, with a press having female blanking and forming dies arranged therein, of a feed for advancing a sheet or strip step by step across said dies, a punch coacting with a blanking die to stamp a blank from said sheet or strip, means for reinserting said blank in said sheet or strip to be advanced thereby over a forming die, a male die coacting with said forming die to shape said blank, means for returning said shaped blank to its initial position relatively to said sheet or strip, transfer means carried by said feed and operated thereby to advance said shaped blank in unison with said sheet or strip but independent thereof, and means for retaining said shaped blank accurately in position after being released by said transfer means.

14. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate successively upon each blank and to form it into a desired shape, a feed for advancing a sheet or strip step by step across all of said dies, and transfer means for advancing said shaped blanks step by step with said strip but independent thereof to move said blanks from one die to another and to remove the blank from the last die.

15. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate successively upon each blank and to form it into a desired shape, a feed for advancing a sheet or strip step by step across all of said dies, and transfer means operated by said feed for advancing said shaped blanks step by step in unison with said strip but independent thereof to move said blanks from one die to another and to remove the blank from the last die.

16. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate upon said blanks and form the same into desired shapes, means for retaining a shaped blank in position above each forming die, a feed for advancing a sheet or strip step by step across all of said dies, and transfer means for advancing said shaped blanks step by step in unison with said strip but independent thereof to move said blanks from one die to another and to remove the blank from the last die.

17. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate upon said blanks and form the same into desired shapes, means for retaining a shaped blank in position above each forming die, a feed for advancing a sheet or strip step by step across all of said dies, and transfer means carried by said feed and operated thereby to advance said shaped blanks step by step in unison with said strip but independent thereof to move said blanks from one die to another and to remove the blank from the last die.

18. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate upon each of said blanks and to form it into a desired shape, grippers for engaging a sheet or strip and reciprocable to advance it step by step across said dies, means for operating said grippers, transfer fingers carried by said grippers for engaging said shaped blanks to move the same independent of said sheet or strip, and means for operating said transfer fingers.

19. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate upon each of said blanks and to form it into a desired shape, grippers for engaging a sheet or strip and reciprocable to advance it step by step across said dies, means for operating said grippers, transfer fingers carried by said grippers for engaging said shaped blanks to move the same independent of said sheet or strip, and means operated by said gripper operating means for operating said transfer fingers.

20. A blanking and forming press, comprising a die block carrying a plurality of female dies, a platen reciprocable toward and from said die block, a blanking punch carried by said platen for coacting with one of said dies to stamp blanks from a sheet or strip, other punches carried by said platen for coacting with the other dies to operate upon each of said blanks and to form it into a desired shape, means for retaining a shaped blank in position above each forming die, grippers for engaging a sheet or strip and reciprocable to advance it step by step across said dies, means for operating said grippers, transfer fingers carried by said grippers for engaging said shaped blanks to move the same independent of said sheet or strip, and means for operating said transfer fingers.

21. A blanking and forming press, comprising a die block carrying a plurality of female dies, a platen reciprocable toward and from said die block, a blanking punch carried by said platen for coacting with one of said dies to stamp blanks from a sheet or strip, a presser foot arranged around said blanking punch, means for pressing said presser foot against said sheet or strip to remove deformations caused by said blanking punch stamping the blank therefrom, other punches carried by said platen for coacting with the other dies to operate upon each of said blanks and to form it into a desired shape, grippers for engaging a sheet or strip and reciprocable to advance it step by step across said dies, means for operating said grippers, transfer fingers carried by said grippers for engaging said shaped blanks to move the same independent of said sheet or strip, and means for operating said transfer fingers.

22. The combination, in a press, of a reciprocable feed for advancing a sheet or strip step by step through said press, blanking and forming dies arranged in series along the path of said feed, blanking and forming punches coacting with said blanking and forming dies respectively for stamping blanks in succession from said sheet or strip and forming the same into desired shapes, knockout mechanism arranged within said blanking die for reinserting said blanks into said sheet or strip to be moved thereby into alinement with a forming die and punch, means for pressing said sheet or strip against said blanking die during the insertion therein of said blanks, and means for engaging each blank after being shaped by said forming punch and advancing it with said sheet or strip but independent thereof.

WALTER FERRIS.